March 16, 1965    HO CHOW ETAL    3,173,711
HOSE COUPLING

Filed Aug. 11, 1961    2 Sheets-Sheet 1

INVENTORS
HO CHOW
ISAAC RINKEWICH
BY
James and Franklin
ATTORNEYS

March 16, 1965 HO CHOW ETAL 3,173,711
HOSE COUPLING
Filed Aug. 11, 1961 2 Sheets-Sheet 2

INVENTORS
HO CHOW
ISAAC RINKEWICH
BY
James and Franklin
ATTORNEYS

United States Patent Office 3,173,711
Patented Mar. 16, 1965

3,173,711
HOSE COUPLING
Ho Chow, Yonkers, N.Y., and Isaac Rinkewich, Hasbrouck Heights, N.J., assignors to International Patent Research Corp., New York, N.Y., a corporation of New York
Filed Aug. 11, 1961, Ser. No. 130,968
4 Claims. (Cl. 285—92)

The present invention relates to a device to which the end of a hose may be readily connected and held in sealed relationship in a reliable manner.

Devices of the general type in question are in widespread use in many fields, of which the home gardening field is perhaps typical. Fittings must be attached to the ends of a hose, such as rubber garden hose, so that the hose may be placed in fluid communication at one end with nozzles or sprinkling devices and at the other end with spigots or other sources of water. In addition, when a section of a hose becomes damaged it is desirable that the damaged hose section be excised, the ends of the undamaged parts of the hose then being connected to one another by means of an appropriate fitting. In some instances fittings of the type under discussion are provided on the hose when it is purchased; in other instances the hose alone is purchased and fittings are attached by the user. The coupling unit of the present invention is adaptable for all such uses—it may be attached to hose lengths by the manufacturer before sale thereof, and is particularly adapted for attachment to the hose by the ultimate user.

It is a requirement of fittings of the type under discussion that they so engage the hose as to be very reliably attached thereto in non-leaking relation therewith. It is not too difficult, in the case of fittings permanently attached to the hose at the time of manufacture, to produce a good seal between the hose and the fitting, but even such a seal tends to lose its effectiveness as the hose ages, and ordinarily no means are provided for restoring the effectiveness of the seal in such an eventuality. The device of the present invention permits the attainment of an effective seal even when the fitting is attached to the hose by a relatively unskilled person, ensures that the seal between the fitting and the hose will be reliably retained, and permits adjustment of the connection between the fitting and the hose from time to time in order to restore the seal as the hose ages or becomes worn.

The device of the present invention accomplishes these results by means of a structure which is simple and easy to manufacture and which is exceptionally easy to manipulate. Thus initial cost is low, and the device will have special appeal to the "do-it-yourself" market because of the relatively simple and foolproof nature of the manipulation involved in order to attach the fitting to the hose. Moreover, the cooperation between the parts is such that the normal forces to which the fitting may be subjected in use will at best cause the hose to be more firmly clamped and sealed to the fitting and at worst will not detract from the security with which the parts are clamped together.

To these ends the coupling unit is provided with a central supporting member over which the hose is adapted to be telescoped. A bushing is slidably mounted on that member and is provided with an inner surface, preferably tapered, which is threaded so that it can be screwed onto the outer surface of the telescoped hose in order to firmly and effectively clamp the hose against the inner supporting member in sealing relationship thereto. A sleeve is threadedly telescopically related to the bushing and is adapted, once the bushing has been screwed over the hose to clamping position, to telescope outwardly from the bushing into engagement with an abutment or stop on the supporting member. The sleeve and the bushing are threadedly connected to provide for this telescoping action, and the direction of the threads between sleeve and bushing is opposite from the direction of the bushing threads which engage the hose. Consequently both the bushing and the sleeve are adapted to be rotated in the same direction to move the parts into the proper position for clamping and locking the hose on the coupling unit. Moreover, because the two sets of threads are in opposite directions, once the parts have been moved to their final locking position they will normally tend to remain in that position.

The sleeve and bushing, considered together, constitute a locking assembly surrounding the central supporting member of the unit. That assembly is so constructed that it may be telescoped over the central supporting member for purposes of initial assembly and when thus telescoped will tend to remain connected thereto although permitted a limited degree of movement relative thereto. This result is achieved by providing that assembly with a flexible part which can slide over the outer tip of the central supporting member upon the initial assembly operation, but which thereafter will so engage with that central supporting member as to prevent disassembly of the parts. In addition, this part may slidably frictionally engage the central supporting member while the locking assembly is in operative position, thus inhibiting sliding movement of the locking assembly relative to the central supporting member and also inhibiting undesired rotation of parts of the locking assembly after the hose has been clamped in place. Hence the security of the attachment of the coupling unit to the hose and the permanence of the seal therebetween is enhanced. In the form here specifically disclosed the sleeve is provided with a plurality of radially inwardly and axially outwardly extending resilient fingers adapted to resiliently press against the central supporting member in frictional engagement therewith, the outer end of that central supporting member being enlarged so as to define, together with the fingers, a stop preventing removal of the locking assembly from the central supporting member.

To the accomplishment of the above, and to such other objects as may hereinafter appear, the present invention relates to the construction of a hose coupling unit, as defined in the appended claims and as described in this specification, taken together with the accompanying drawings, in which:

Figure 1:
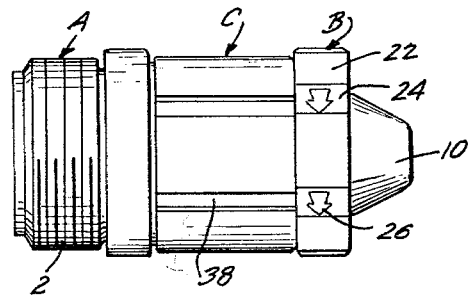
FIG. 1 is a side elevational view of one embodiment of the present invention.
Figure 5:
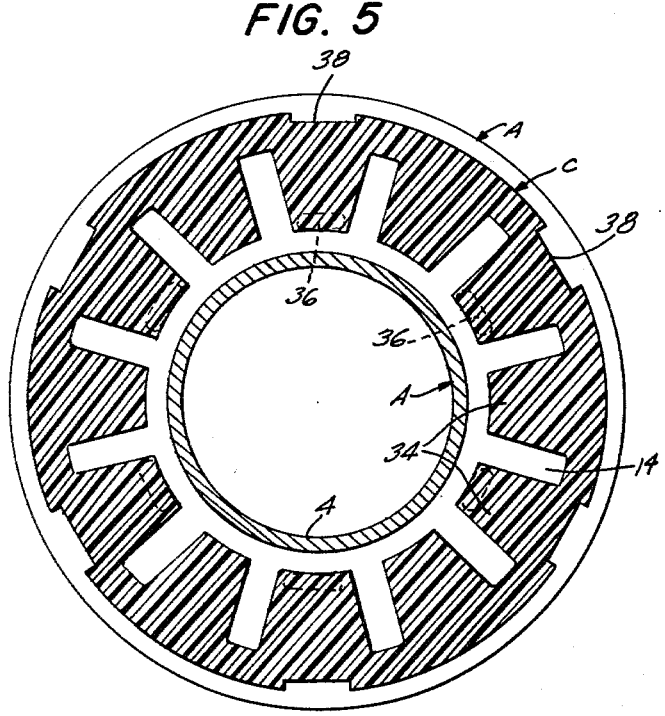
FIG. 5 is a cross sectional view taken along the line 5—5 of FIG. 2.

The coupling unit of the present invention comprises a supporting body A on which a bushing B and a sleeve C are mounted. The supporting body A is here specifically disclosed in the form of a male-type attachment adapted to be screwed into a female socket. It comprises an externally threaded male plug portion 2 from which a central hose-supporting tubular member 4 extends, the outer end of the central supporting member 4 being enlarged, at 6, and there provided with a peripheral groove 8 and a tapering tip 10 the end of which is open, at 12, to permit water or other fluid to pass therethrough. It will be noted that the central supporting member 4 is radially smaller than the plug portion 2, the wall 14 defining an outwardly facing abutment at the inner end of the supporting member 4. It will be appreciated that the disclosure of the supporting body A as a male type plug is by way of exemplification only, and the portion 2 thereof could constitute a female type plug or, if a hose mender is involved, the portion 2 thereof would have central supporting members 4 extending from both sides thereof. Other modifications along these lines will suggest themselves in accordance with what is conventional or known in the field.

The bushing B, which may be made of metal or other suitable structural material, comprises a ring-like body 16 the inner surface 18 of which is preferably tapered in a radially and axially outward direction and threaded in a given sense, for example, in a right-hand direction. The minimum inner radius of the ring 16, at the point 20, is slightly greater than the maximum outer radius of the enlarged end portion 6 of the central supporting member 4, so that the bushing B may be slid over the supporting member end 6. The outer surface of the axially outer part of the ring 16 is radially enlarged at 22, may be provided with a curcumferentially disposed series of depressions 24 to facilitate the grasping and rotation of the bushing B, and arrows or other indicia 26 (see FIG. 1) may be formed on the outer surface of the portion 22 in order to indicate the direction in which the bushing B is to be rotated when the unit is to be attached to a hose.

The sleeve C comprises a ring-like body 28 adapted to telescope over the body portion 16 of the bushing B. Its inner surface is threaded, at 30, and that thread is adapted to cooperate with a threaded portion 32 formed on the outer surface of the bushing B, preferably at the axially inner end thereof. The threads 30 and 32 have a sense opposite from the threads 18. Thus if the threads 18 are right hand threads, the threads 30 and 32 are left hand threads. The axially inner end of the sleeve C is provided with a circumferentially disposed array of fingers 34 which are oriented radially inwardly and axially outwardly from to the inner end of the ring body 28 so as to engage the outer surface of the central supporting member 4. These fingers 34 are resiliently flexible, and may be provided with bosses 36 adapted to extend rearwardly thereof. The outer surface of the body 28 of the sleeve C may be provided with circumferentially disposed recesses 38 to facilitate the manual rotation of the sleeve C. The sleeve C may be formed of any suitable structural material, but in the form here specifically disclosed it is preferred that it be manufactured of a suitable synthetic plastic material which will be substantially rigid in the thicknesses provided for the body 28 but which will permit the integrally formed fingers 34 to be resiliently flexible and to press against the outer surface of the central supporting member 4 with appreciable force while at the same time substantially conforming to the circular nature thereof, thereby to frictionally slidably engage the central supporting member 4.

Figure 2:
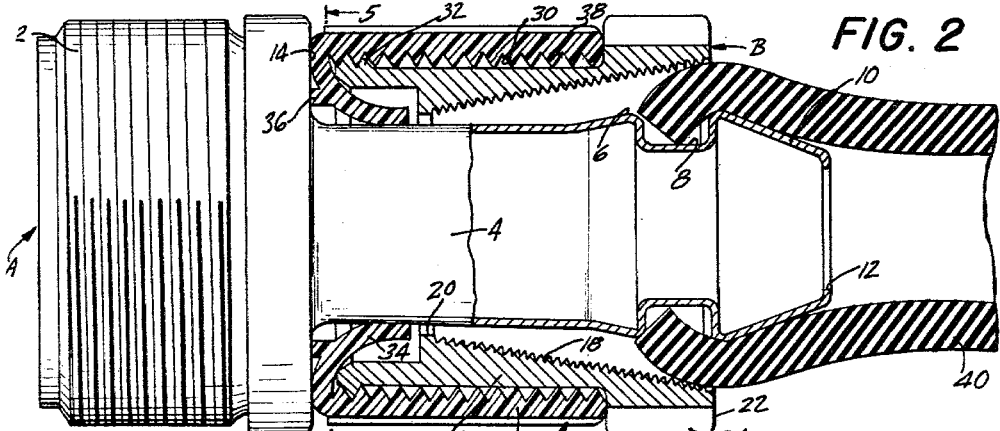
FIG. 2 is a cross sectional view on an enlarged scale of the coupling unit in the first stage of its attachment to the end of a hose, the hose being telescoped over the outer end of the central supporting member and the bushing and sleeve being not yet engaged with the hose.

When the coupling unit of the present invention is to be attached to the end of a hose 40 the bushing B and sleeve C are telescoped relative to one another by relative rotation of those parts, the telescoping action occurring by virtue of the engagement of the screw threads 30 and 32. The degree of this telescoping movement is preferably limited in any appropriate manner, as by engagement of the inner end of the bushing B against the fingers 34 on the sleeve C, or by engagement of the outer end of the sleeve body 28 against the portion 22 of the bushing B, or both. The bushing B and sleeve C, assembled together and relatively inwardly telescoped, are slid inwardly as a unit to a position shown in FIG. 2, in which the inner end of the sleeve C engages the abutment 14. This exposes the tip 10 of the central supporting member 4 and, as shown in FIG. 2, permits that tip 10 to be telescoped into the hose 40, the hose end being received within the circumferential recess 8. The existence of the recess 8, at this stage of the attachment operation, usually constitutes a stop, indicating that the central supporting member 4 has been sufficiently telescoped into the hose 40, but it is possible to provide for further telescoping action between these parts.

Figure 3:
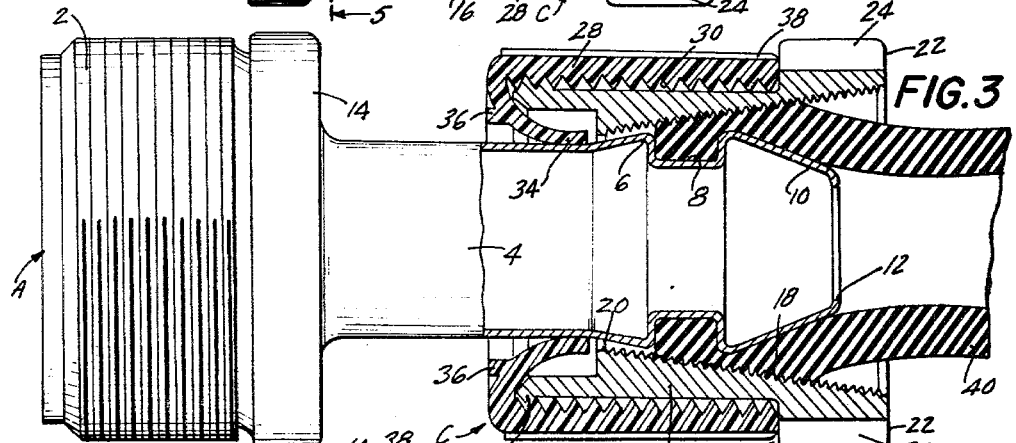
FIG. 3 is a view similar to FIG. 2 but showings the parts in an intermediate operative position in which the bushing has clamped the hose end to the central supporting member.

Next the bushing B is grasped and slid outwardly until its inner surface 18 engages the outer surface of the hose 40, and it is then rotated in the direction of the arrows 26. Its inner screw threaded tapered surface 18 will bite into the outer surface of the hose 40 and screw itself thereover, clamping and deforming the end of the hose 40 firmly against the outer surface of the central supporting member 4, as shown in FIG. 3. The sleeve C moves along with the bushing B during this operation.

Figure 4:
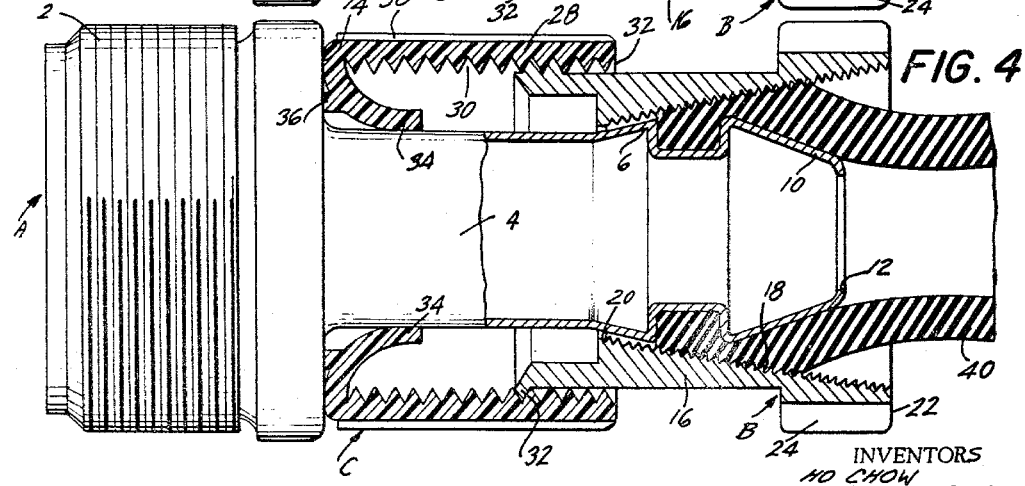
FIG. 4 is a view similar to FIG. 3 but showing the bushing and sleeve in their final locking positions, the sleeve engaging with the abutment on the central supporting member.

After the bushing B has been screwed onto the hose 40 as far as it will go through the application of a normal amount of force, which will ordinarily be sufficient to produce a good seal between the hose 40 and the central supporting member 4, the sleeve C is then rotated relative to the bushing B so as to cause those parts to telescope outwardly relative to one another, or, more specifically, so as to cause the sleeve C to move inwardly toward and into engagement with the abutment 14, to the position shown in FIG. 4. Because the threads 30 and 32 have a sense opposite to that of the threads 18, the sleeve C is rotated in the same direction as the bushing B was previously rotated, that is to say, the same direction as the arrows 26. This greatly simplifies the attachment of the coupling unit to the hose, since both parts B and C are adapted to be rotated in the same direction.

With the parts shown in their position in FIG. 4 the hose 40 is securely clamped to the coupling unit, and in a very reliable manner. If thereafter the bushing B should be subjected to a force tending to rotate it in the direction of the arrows 26, that will merely tend to more securely clamp the hose 40 against the member 4. If the bushing B is subjected to a force tending to rotate it in the opposite direction, that would tend to cause it to telescope further outwardly relative to the sleeve C. Since the sleeve C is firmly against the abutment 14, any force which might result from such a movement would tend to push the bushing B outwardly and thus more firmly clamp the hose 40 in place. If an external force should tend to rotate the sleeve C in the direction of the arrows 26, that would tend to cause it to telescope outwardly relative to the bushing B, and the hose 40 will be more firmly clamped in place for the reasons just explained. If the sleeve C is subjected to forces tending to rotate it in the opposite direction, it will telescope over the bushing B and move away from the abutment 14. However, the clamping of the hose 40 will not be adversely affected, because that clamping and sealing is provided primarily by the screwing of the bushing B thereover, and the threaded interengagement between bushing B and the hose 40 will not be directly affected. Moreover, the frictional engagement between the fingers 34 and the central supporting member 4 will end to inhibit accidental rotation of the sleeve C.

If it is desired to detach the coupling unit from the hose 2 separate operations must be performed. First the sleeve C must be manually rotated so as to telescope over the bushing B, and then the bushing B must be rotated so as to unscrew from the end of the hose 40. This type of action will occur only when desired and when appreciable force is applied to the parts to cause them to thus move, the bushing B being frictionally retained in rotative position relative to the hose 40 against undesired or accidental rotation by reason of the friction between the hose body and the threads 18 which bite into that body, and the sleeve C being frictionally retained against undesired or accidental rotation by means of the fingers 34.

It will further be appreciated that because of the orientation of the fingers 34 the assembly comprising the bushing B and sleeve C can be slid axially inwardly over the central supporting member 4 and its enlarged end 6, but outward movement of the sleeve C and attached bushing B will be prevented by engagement of the tips of the fingers 34 with the enlarged outer end 6 of the member 4, and particularly by engagement within the recess 8 on the outer surface of the supporting member 4.

Thus it will be seen that the coupling unit of the present invention is formed of a limited number of easily and inexpensively manufactured and assembled parts, which parts cooperate with one another in such a manner as to simplify the mode of attachment of the coupling unit to a hose, while at the same time producing an extremely effective and reliable clamp and seal between the fitting and the end of a hose attached thereto. Detachment of the coupling unit from the hose can, however, readily be accomplished when that is desired. Moreover, the clamping action may be adjusted at any time and without requiring any but the most rudimentary type of manual manipulation. In addition, the structure is such that a single coupling is capable of accommodating hoses of different sizes. For example, one standard size coupling can be used effectively with hoses having diameters of 3/8 inch, 7/16 inch, 1/2 inch and 9/16 inch.

While but a single embodiment of the present invention is here disclosed, it will be apparent that many variations may be made therein, all within the spirit of the invention as defined in the following claims.

We claim:

1. A hose coupling unit comprising a supporting member over which a hose is adapted to be telescoped, a bushing slidably mounted on said member and having a first threaded surface defining an inner surface thereof which is adapted to be threaded onto the outer surface of said hose to clamp said hose onto said member, said bushing having a second threaded surface, a sleeve telescopically related to said bushing and having a threaded surface which is threadedly engaged with the second threaded bushing surface, thereby to cause said sleeve and said bushing to telescope relative to one another, and a rearwardly located abutment on said member against which said sleeve engages when outwardly telescoped relative to said bushing, the outer end of said member, over which the hose is adapted to be telescoped, being radially enlarged, said sleeve being provided with a flexible part oriented radially inwardly and axially outwardly to a position radially inside the periphery of said outer end of said member, said flexible part being slidable over the axially inner part of said member, and said sleeve and bushing being freely slidable over said outer end of said member except for the action of said flexible part, said flexible part having a thickness sufficient to support and steady one end of said sleeve.

2. The hose coupling unit of claim 1, in which said flexible part frictionally grips said axially inner part of said member as it slides thereover.

3. The hose coupling unit of claim 2, in which said first threaded surface of said bushing is threaded in a first direction, said second threaded surface of said bushing is threaded in a second direction opposite from said first direction, said threaded surface of said sleeve being threaded in said second direction.

4. The hose coupling unit of claim 1, in which said first threaded surface of said bushing is threaded in a first direction, said second threaded surface of said bushing is threaded in a second direction opposite from said first direction, said threaded surface of said sleeve being threaded in said second direction.

References Cited in the file of this patent
UNITED STATES PATENTS

| | | |
|---|---|---|
| Re. 20,497 | Johnson | Sept. 7, 1937 |
| 145,731 | Edson | Dec. 23, 1873 |
| 589,362 | Miles | Aug. 31, 1897 |
| 1,014,920 | Thomas | Jan. 16, 1912 |
| 1,926,197 | Durr | Sept. 12, 1933 |
| 2,462,323 | Hurst | Feb. 22, 1949 |
| 2,587,784 | Story | Mar. 4, 1952 |

FOREIGN PATENTS

| | | |
|---|---|---|
| 16,159 | France | Sept. 13, 1912 |